US009106814B2

(12) United States Patent
Lochner et al.

(10) Patent No.: US 9,106,814 B2
(45) Date of Patent: Aug. 11, 2015

(54) APPARATUSES FOR ROTATING A SENSING DEVICE

(71) Applicant: The United States of America as represented by the Federal Bureau of Investigation, Department of Justice, Washington, DC (US)

(72) Inventors: Michael Blair Lochner, Occoquan, VA (US); Patrick Andrew Buxton, Spotsylvania, VA (US)

(73) Assignee: The United States of America as represented by the Federal Bureau of Investigation, Dept. of Justice, Washington, DC (US)

( * ) Notice: Subject to any disclaimer, the term of this patent is extended or adjusted under 35 U.S.C. 154(b) by 265 days.

(21) Appl. No.: 13/676,621

(22) Filed: Nov. 14, 2012

(65) Prior Publication Data

US 2014/0132828 A1     May 15, 2014

(51) Int. Cl.
| | |
|---|---|
| *H04N 5/225* | (2006.01) |
| *F16M 11/10* | (2006.01) |
| *F16M 11/18* | (2006.01) |
| *F16M 11/20* | (2006.01) |
| *F16M 13/02* | (2006.01) |

(52) U.S. Cl.
CPC ............. *H04N 5/2251* (2013.01); *F16M 11/10* (2013.01); *F16M 11/18* (2013.01); *F16M 11/2014* (2013.01); *F16M 13/02* (2013.01); *F16M 13/027* (2013.01)

(58) Field of Classification Search
CPC ... H04N 5/2251; H04N 5/2252; H04N 5/232; H04N 5/247; F16M 11/06; F16M 11/08; F16M 11/10; F16M 11/12; F16M 11/18; F16M 11/2014; F16M 11/2021; F16M 11/2028; F16M 11/2035; F16M 11/2057; F16M 11/2064

USPC .......... 348/143, 151, 211.99, 211.4, 373–375
See application file for complete search history.

(56) References Cited

U.S. PATENT DOCUMENTS

| | | | | |
|---|---|---|---|---|
| 4,047,448 | A | * | 9/1977 | Pardo et al. ...................... 74/417 |
| 4,832,425 | A | * | 5/1989 | Walther et al. ............. 359/212.1 |
| 5,850,579 | A | * | 12/1998 | Melby et al. .................. 396/427 |
| 6,762,790 | B1 | * | 7/2004 | Matko et al. .................. 348/148 |
| 7,038,709 | B1 | * | 5/2006 | Verghese ....................... 348/169 |
| 7,256,834 | B1 | * | 8/2007 | Sagefalk et al. .............. 348/373 |
| 7,626,633 | B2 | * | 12/2009 | Okamoto et al. ............. 348/373 |
| 7,752,938 | B2 | * | 7/2010 | Kanayama ...................... 74/417 |
| 7,942,276 | B2 | * | 5/2011 | Johnson et al. ............. 211/1.53 |
| 2002/0169024 | A1 | * | 11/2002 | Nelson ............................ 464/57 |
| 2003/0071914 | A1 | * | 4/2003 | Wei et al. ...................... 348/375 |
| 2003/0194230 | A1 | * | 10/2003 | Tamura ......................... 396/427 |
| 2004/0080667 | A1 | * | 4/2004 | Jeong et al. ................... 348/374 |
| 2008/0013944 | A1 | * | 1/2008 | Yamane et al. ............... 396/427 |
| 2011/0026913 | A1 | * | 2/2011 | Dumm .......................... 396/428 |
| 2012/0263446 | A1 | * | 10/2012 | Dumm ............................ 396/58 |

* cited by examiner

*Primary Examiner* — Timothy J Henn
(74) *Attorney, Agent, or Firm* — Kristin K. Vidovich (57) ABSTRACT

An apparatus for rotating a sensing device about a pan axis and a tilt axis may include an enclosure, first and second rotatable dials configured to allow a user to adjust an angular pan orientation and an angular tilt orientation, respectively, of the sensing device. The apparatus may include outer and inner concentric shafts attached to the first dial and the second dial, respectively. The apparatus may also include a frame assembly attached to the outer shaft such that the frame assembly rotates about the pan axis as the first dial is rotated. The frame assembly may include a base configured to rotate about the tilt axis and that supports the sensing device. The frame assembly may also include a pin and gear assembly operatively coupling the base to the inner shaft such that rotation of the second dial rotates the base about the tilt axis.

17 Claims, 4 Drawing Sheets

APPARATUSES FOR ROTATING A SENSING DEVICE

STATEMENT OF GOVERNMENT INTEREST

The invention described herein was made by employees of the United States Government and may be manufactured and used by or for the Government of the United States of America for governmental purposes without the payment of any royalties thereon or therefore.

BACKGROUND

1. Field

Embodiments of the present invention relate to apparatuses for rotating a sensing device and, particularly, to apparatuses for rotating a sensing device about a pan axis and a perpendicular tilt axis.

2. Background

A camera, for example, a security camera or a surveillance camera, may be housed within an enclosure. Typically, if a user wishes to change the field of view of an enclosed camera or make fine adjustments to the existing field of view, the user must disassemble the enclosure to gain access to the camera. Once the enclosure is disassembled, the user manually readjusts the camera orientation to change the field of view, and then reassembles the enclosure. This process can be time-consuming and increases the risk that the enclosure will be contaminated with an undesirable substance, for example, water or dirt.

Accordingly, there is a need for an apparatus that allows for quick and contaminate-free adjustment of a sensing device such as a camera.

BRIEF SUMMARY

In some embodiments, an apparatus for rotating a sensing device about a first axis and a second axis relative to a mounting surface includes a first dial configured to rotate to allow a user to adjust a first axis angular orientation of the sensing device. The first dial is positioned on a first side of the mounting surface. The apparatus may also include a second dial configured to rotate to allow a user to adjust a second axis angular orientation of the sensing device, and an outer shaft attached to the first dial. The outer shaft defines a first channel and passes through a second channel defined by the mounting surface. The apparatus may also include an inner shaft attached to the second dial. The inner shaft passes through the first channel defined by the outer shaft. The inner shaft is also concentric with the outer shaft. Further, the apparatus includes a frame assembly attached to the outer shaft. The frame assembly is configured to rotate about the first axis as the first dial is rotated. The frame assembly is positioned on a second side of the mounting surface that is opposite from the first side of the mounting surface. The frame assembly includes a base configured to rotate about the second axis and configured to support the sensing device. The frame assembly also includes a pin and gear assembly configured to operatively couple the base to the inner shaft such that rotation of the second dial rotates the base about the tilt axis.

In some embodiments, an apparatus for rotating a sensing device about a pan axis and a tilt axis includes an enclosure that defines a cavity for housing the sensing device. The enclosure has an exterior surface defining a first channel that extends to the cavity. The apparatus further includes a first dial configured to rotate to allow a user to adjust an angular pan orientation of the sensing device and a second dial configured to rotate to allow a user to adjust an angular tilt orientation of the sensing device. The apparatus also includes an outer shaft attached to the first dial. The outer shaft defines a second channel and passes through the first channel defined by the exterior surface of the enclosure. The outer shaft defines an axis that is coaxial with the pan axis. The apparatus also includes an inner shaft attached to the second dial. The inner shaft passes through the second channel defined by the outer shaft. The inner shaft is concentric with the outer shaft. Further, the apparatus includes a frame assembly attached to the outer shaft such that the frame assembly rotates about the pan axis as the first dial is rotated. The frame assembly is positioned within the cavity and includes a base configured to rotate about the tilt axis. The base supports the sensing device. The frame assembly also includes a pin and gear assembly operatively coupling the base to the inner shaft such that rotation of the second dial rotates the base about the tilt axis.

In some embodiments, an apparatus for rotating a camera about a pan axis and a tilt axis that is perpendicular to the pan axis includes an enclosure that defines an environmentally sealed cavity for housing the camera. The enclosure has an exterior surface defining a first recess. The first recess has a floor defining a first channel that extends to the environmentally sealed cavity. The apparatus also includes a first dial configured to rotate to allow a user to adjust an angular pan orientation of the camera. The first dial is seated within the first recess and defines a second recess on a first side of the first dial. The first dial defines a first annular notch on a second side of the first dial opposite from the first side of the first dial. The first dial further includes a first gasket securely seated within the first notch. The first gasket contacts the floor of the enclosure to create an environmental seal. The apparatus further includes a second dial configured to rotate to allow a user to adjust an angular tilt orientation of the camera. The second dial is seated within the second recess. The second dial defines a second annular notch on a side of the second dial that is adjacent to the first dial and further includes a second gasket securely seated within the second notch. The second gasket contacts the floor of the first dial to create an environmental seal. Further, the apparatus includes an outer shaft attached to the first dial. The outer shaft defines a second channel and passes through the first channel defined by the floor of the enclosure. The outer shaft has an axis that is coaxial with the pan axis. The apparatus also includes an inner shaft attached to the second dial and passes through the second channel defined by the outer shaft. The inner shaft is concentric with the outer shaft. A worm is attached to the inner shaft and has a helical thread. The apparatus further comprises a frame assembly that is configured to rotate about the pan axis as the first dial is rotated. The frame assembly is positioned within the environmentally sealed cavity. The frame assembly includes a first plate attached to the outer shaft and first and second spaced apart arms that extend from the first plate in a direction away from the first dial. The frame assembly also includes a first pin rotatably attached to the first and second arms and a first gear having a first plurality of teeth attached to the first pin such that the first pin rotates as the first gear rotates. The first plurality of teeth meshes with the helical thread of the worm. The frame assembly further includes a second gear having a second plurality of teeth and attached to the first pin such that the second gear rotates as the first pin rotates. The frame assembly also includes third and fourth spaced apart arms that extend from the first plate in a direction away from the first dial, and a second pin extending from the third arm. Additionally, the frame assembly includes a third gear having a third plurality of teeth and rotatably attached to the second pin. The third plurality of teeth meshes with the second plurality of teeth of the second gear. The frame assembly further includes a third pin rotatably attached to the third and fourth arms. The third pin has an axis that is coaxial with the tilt axis. The frame assembly also includes a fourth gear having a fourth plurality of teeth and rotatably attached to the third pin such that the third pin rotates as the fourth gear rotates. Finally, the frame assembly includes a base attached to the third pin such that the base rotates about the tilt axis as the third pin rotates. The base supports the camera.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

This specification discloses embodiments that incorporate the features of this invention. The disclosed embodiments merely exemplify the invention. The scope of the invention is not limited to the disclosed embodiments. The invention is defined by the claims appended hereto.

The embodiments described, and references in the specification to "one embodiment," "an embodiment," "an example embodiment," "some embodiments," "example," etc., indicate that the embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 1:
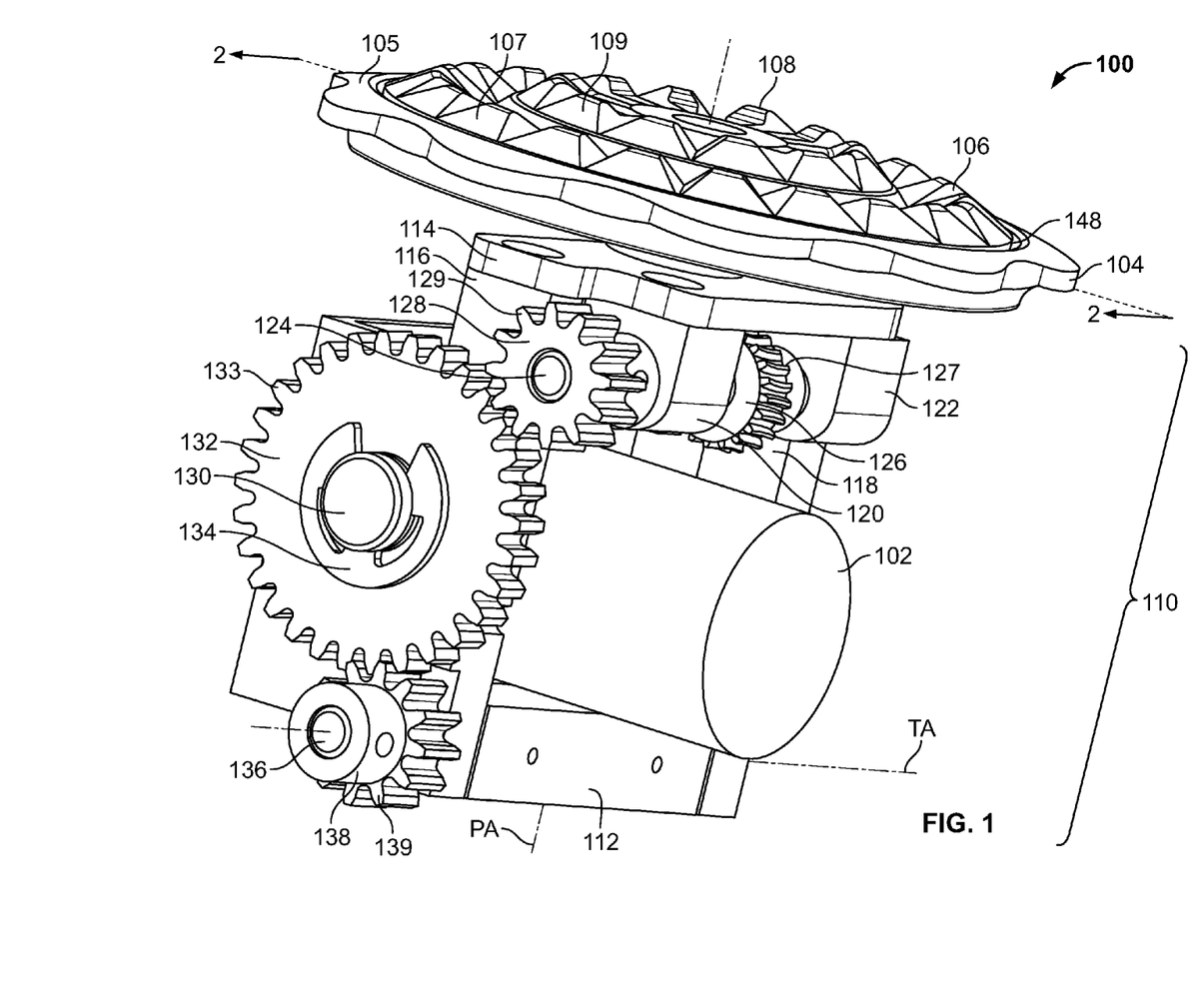
FIG. 1 illustrates a front, top perspective view of an apparatus for rotating a sensing device about a first axis and a second axis according to an embodiment.

FIGS. 1-4 illustrate an apparatus 100 for adjusting the orientation of a sensing device 102 according to an embodiment. In some embodiments, apparatus 100 is configured to rotate sensing device 102 about a first axis PA and a second axis TA to adjust the field of view of sensing device 102. For example, as shown in FIG. 1, the first axis may be a pan axis PA, and the second axis may be a tilt axis TA that is perpendicular to pan axis PA.

Sensing device 102 may be any directional sensing device that acquires images, video feeds, or other information. For example, sensing device 102 may be an imaging device such as a camera that captures still photographs, a camera that captures moving video, or any other suitable image acquisition device having a field of view.

Apparatus 100 may rotate sensing device 102 relative to an exterior surface 105 of an enclosure 104. In FIGS. 1-4, enclosure 104 and exterior surface 105 are only partially shown. Enclosure 104 may define a cavity for housing sensing device 102. In some embodiments, the cavity defined by enclosure 104 may be environmentally sealed. Enclosure 104 may have any suitable shape and size for housing sensing device 102. For example, enclosure 104 may have a rectangular prism shape or spherical shape. In some embodiments, enclosure 104 may also have a transparent wall (not shown) to allow sensing device 102 to acquire an image outside of enclosure 104.

Figure 2:
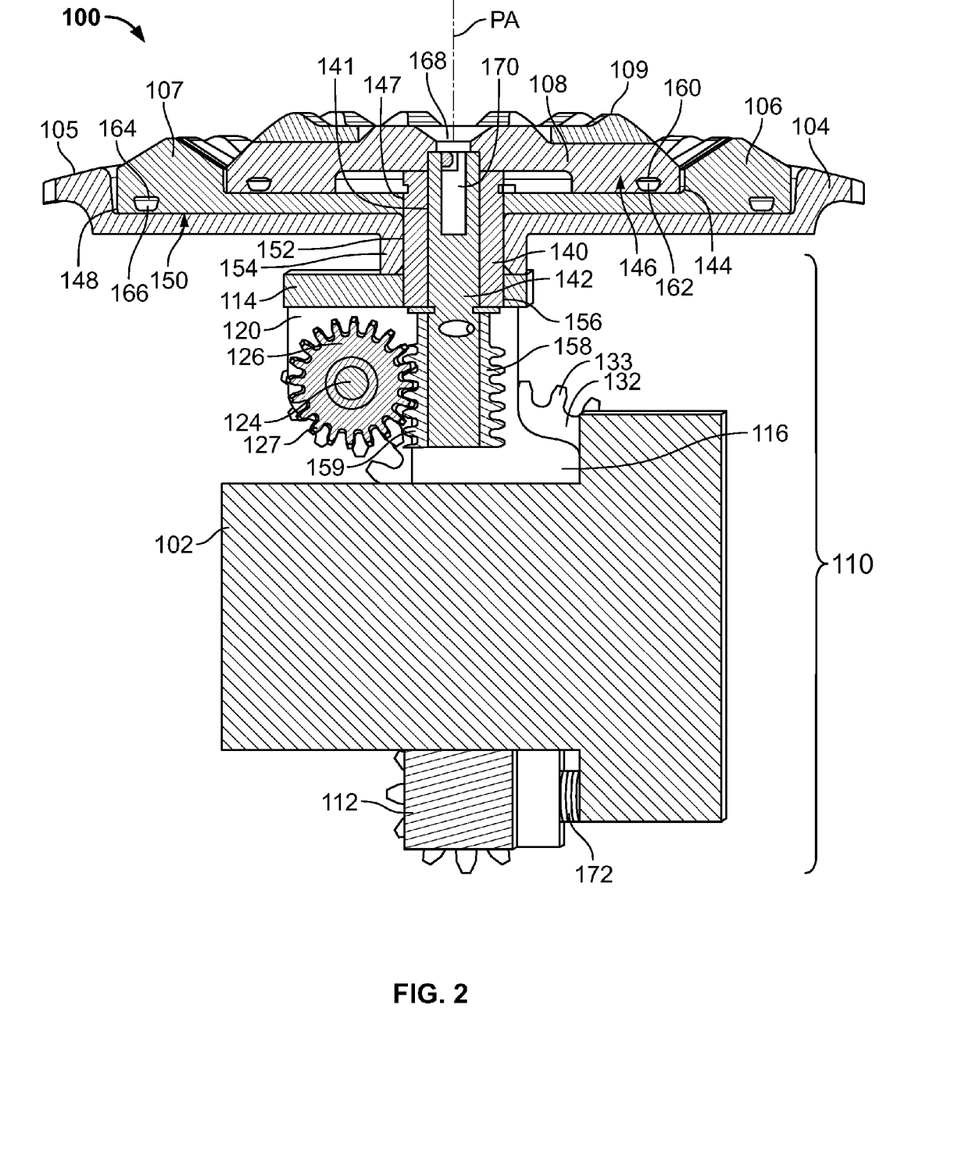
FIG. 2 illustrates a cross-sectional view of the apparatus of FIG. 1 taken along line 2-2 in FIG. 1.

As best seen in FIG. 2, exterior surface 105 may define a channel 152 that extends to the cavity defined by enclosure 104. In some embodiments, enclosure 104 may include a circular, hollow boss 154 that further defines channel 152. Boss 154 extends from exterior surface 105 into the cavity defined by enclosure 104 that houses sensing device 102. In some embodiments, channel 152 is the only opening in the enclosure 104. In such embodiments in which channel 152 is the only opening, the risk that the cavity defined by enclosure 104 is contaminated with an unwanted substance, for example, water or dirt, is reduced.

Figure 4:
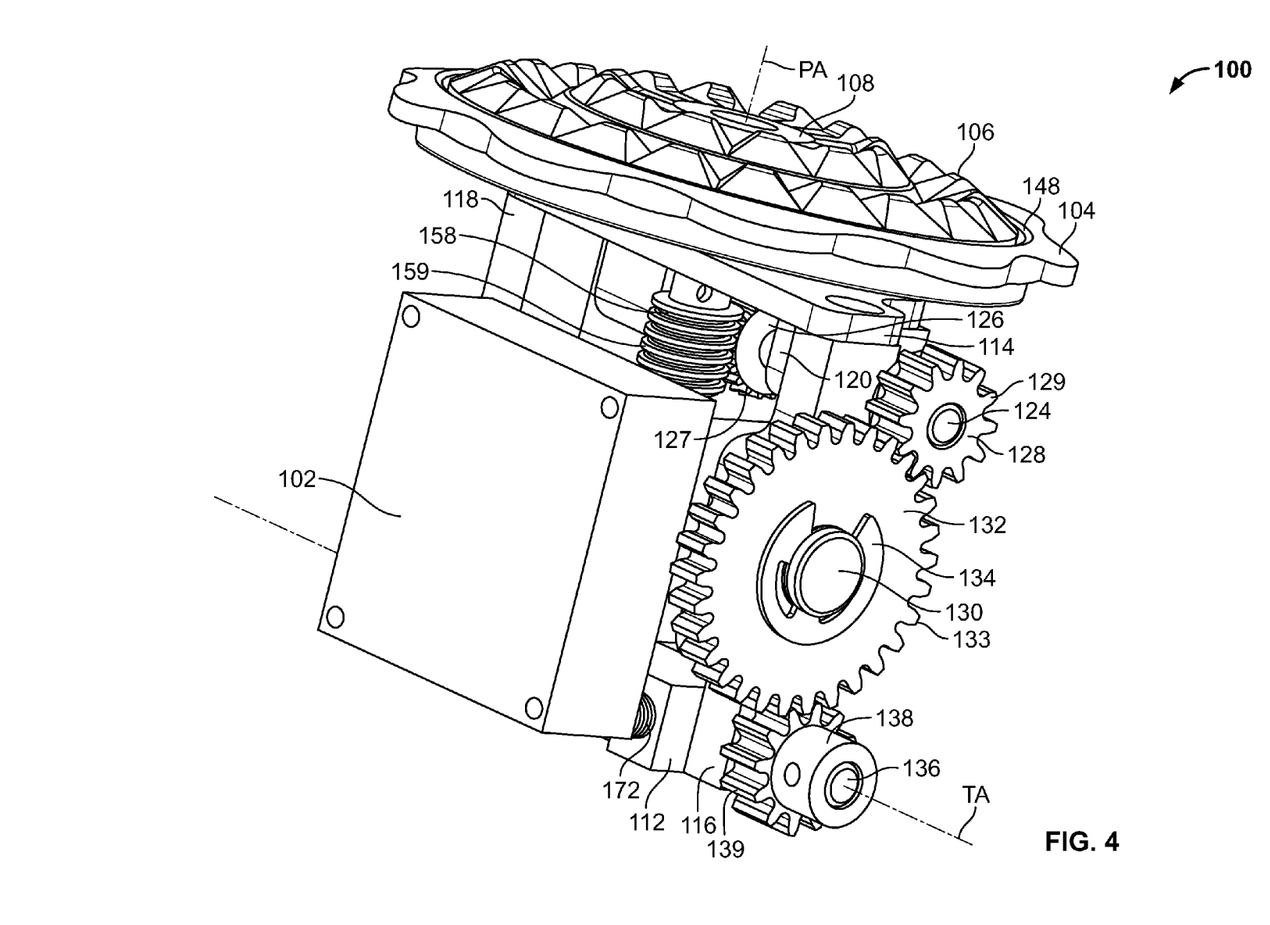
FIG. 4 illustrates a back, top perspective view of the apparatus of FIG. 1.

In some embodiments, as best seen in FIG. 2, exterior surface 105 may define a first recess 148 that has a floor 150. First recess 148 may have a circular shape (as best seen in FIGS. 1 and 4), a polygonal shape, a curvi-linear shape, or any other suitable shape. In such embodiments, floor 150 of first recess 148 may define channel 152.

Enclosure 104 may be made of any suitable material, for example, metal, plastic, or a composite.

Apparatus 100 may also include a first dial (or knob) 106. First dial 106 is configured to rotate to allow a user to adjust an angular orientation of sensing device 102 about first axis PA, for example, to adjust the pan orientation. First dial 106 is positioned on a first side of enclosure 104 that is opposite from the cavity defined by enclosure 104 and at a location accessible to a user. As a user rotates first dial 106, the angular orientation of sensing device 102 about the first axis PA changes, which changes the field of view of sensing device 102 along the first axis PA.

In some embodiments, first dial 106 includes a first annular portion 107 that includes a first plurality of projections on the side of first dial 106 opposite from enclosure 104. First annular portion 107 provides a surface for a user's fingers to contact to rotate first dial 106. The projections of first annular portion 107 create a non-continuous interface that helps prevent a user's fingers from slipping relative to first dial 106.

In some embodiments in which exterior surface 105 defines a recess 148, first dial 106 is seated within first recess 148. This configuration creates a low-profile between enclosure 104 and first dial 106. First dial 106 has a shape that allows first dial 106 to rotate within recess 148. For example, if recess 148 has a circular shape, first dial 106 may have a circular shape that closely corresponds to the shape of recess 148.

In some embodiments, as best seen in FIG. 2, first dial 106 may define a recess 144 having a floor 146. Recess 144 is on a side of first dial 106 opposite from the side of first dial 106 that is adjacent enclosure 104. Recess 144 may have a circular shape, a polygonal shape, a curvi-linear shape, or any other suitable shape.

In some embodiments, as best seen in FIG. 2, first dial 106 may define a first annular notch 164 on the side of first dial 106 that is adjacent enclosure 104. First dial 106 may also include a gasket 166, for example, an O-ring, securely seated within first annular notch 164. First annular notch 164 may have a dove-tail cross-sectional shape, and gasket 166 may have a corresponding dove-tail cross-sectional shape that keeps gasket 166 securely seated within first annular notch 164. First annular notch 164 and gasket 166 may have any other suitable cross-section shape. Gasket 166 may be made from rubber, a thermoplastic, or any other suitable material for creating a seal at the interface between first dial 106 and floor 150 of enclosure 104. In some embodiments, apparatus 100 may be configured such that gasket 166 contacts floor 150 of enclosure 104 to create an environmental seal at the interface. In some embodiments, friction between first gasket 166 and exterior surface 105 maintains the angular first axis orientation of sensing device 102.

Apparatus 100 may also include a second dial (or knob) 108. Second dial 108 is configured to rotate to allow a user to adjust an angular orientation of sensing device 102 about second axis TA, for example, to adjust an angular tilt orientation. Second dial 108 may rotate independently from first dial 106. Second dial 108 is positioned adjacent first dial 106 and at a location accessible to a user. As a user rotates second dial 108, the angular orientation of sensing device 102 about the second axis TA changes, which changes the field of view of sensing device 102 along the second axis TA.

In some embodiments, second dial 108 includes a second annular portion 109 that includes a second plurality of projections on the side of second dial 108 opposite from first dial 106. Second annular portion 109 provides a surface for a user's fingers to contact to rotate second dial 108. The projections of second annular portion 109 create a non-continuous interface that helps prevent a user's fingers from slipping relative to second dial 108.

In some embodiments in which first dial 106 defines recess 144, second dial 108 is seated within recess 144 of first dial 106. This configuration provides a low-profile between second dial 108 and first dial 106. In some embodiments, second dial 108 has a shape that allows second dial 108 to rotate within recess 144. For example, if recess 144 has a circular shape, second dial 108 may have a circular shape that closely corresponds to the shape of recess 144.

In some embodiments, second dial 108 may define a second annular notch 160 on the side of the second dial 108 that is adjacent first dial 106. Second dial 108 may further include a gasket 162, for example, an O-ring, securely seated within second annular notch 160. As shown in FIG. 2, second annular notch 160 may have a dove-tail cross-sectional shape, and gasket 162 may have a corresponding dove-tail cross-sectional shape that keeps gasket 162 securely seated in second annular notch 160. In some embodiments, second annular notch 160 and second gasket 162 may have other suitable cross-sectional shapes. Gasket 162 may be made from rubber, a thermoplastic, or any other suitable material for creating a seal at an interface. In some embodiments, apparatus 100 is configured such that gasket 162 contacts floor 146 of enclosure 104. This interface may create an environmental seal.

First dial 106 and second dial 108 may be positioned external to enclosure 104.

Apparatus 100 may include an outer shaft 140 that is attached to first dial 106 such that outer shaft 140 rotates along with first dial 106. Outer shaft 140 can be integral with or discrete from (as shown in FIGS. 1-4) first dial 106. Outer shaft 140 may be a hollow, generally cylindrical wall extending away from second dial 108 into the cavity defined by enclosure 104. Outer shaft 140 may define a second channel 141. Outer shaft 140 may pass through channel 152 defined by exterior surface 105 of enclosure 104. As best seen in FIG. 2, the axis of outer shaft 140 is coaxial with first axis PA. If outer shaft 140 is discrete from first dial 106, outer shaft 140 may be attached to first dial 106 by any suitable attachment method, for example, welding, adhering, fastening, or press or snap fitting.

Apparatus 100 may also include an inner shaft 142 that is attached to second dial 108 such that inner shaft 142 rotates along with second dial 108. Inner shaft 142 can be integral with or discrete from (as shown in FIGS. 1-4) second dial 108. Inner shaft 142 may be a generally cylindrical rod that extends away from second dial 108 into the cavity defined by enclosure 104. Inner shaft 142 may pass through second channel 141 defined by outer shaft 140. As best seen in FIG. 2, the axis of inner shaft 142 is coaxial with the axis of outer shaft 140 and inner shaft 142 is concentric with outer shaft 140. Inner shaft 142 may rotate independent from outer shaft 140.

In some embodiments, inner shaft 142 defines a channel 170. Channel 170 may have threads for engaging the threads of a tensioning screw (not shown) that couples second dial 108 with inner shaft 142. In some embodiments, selective adjustment of the tensioning screw can adjust the friction between first dial 106 and enclosure 104, and the friction between second dial 108 and first dial 106. In some embodiments, second dial 108 includes a counter-sink bore 168 for receiving the head of the tensioning screw.

Figure 3:
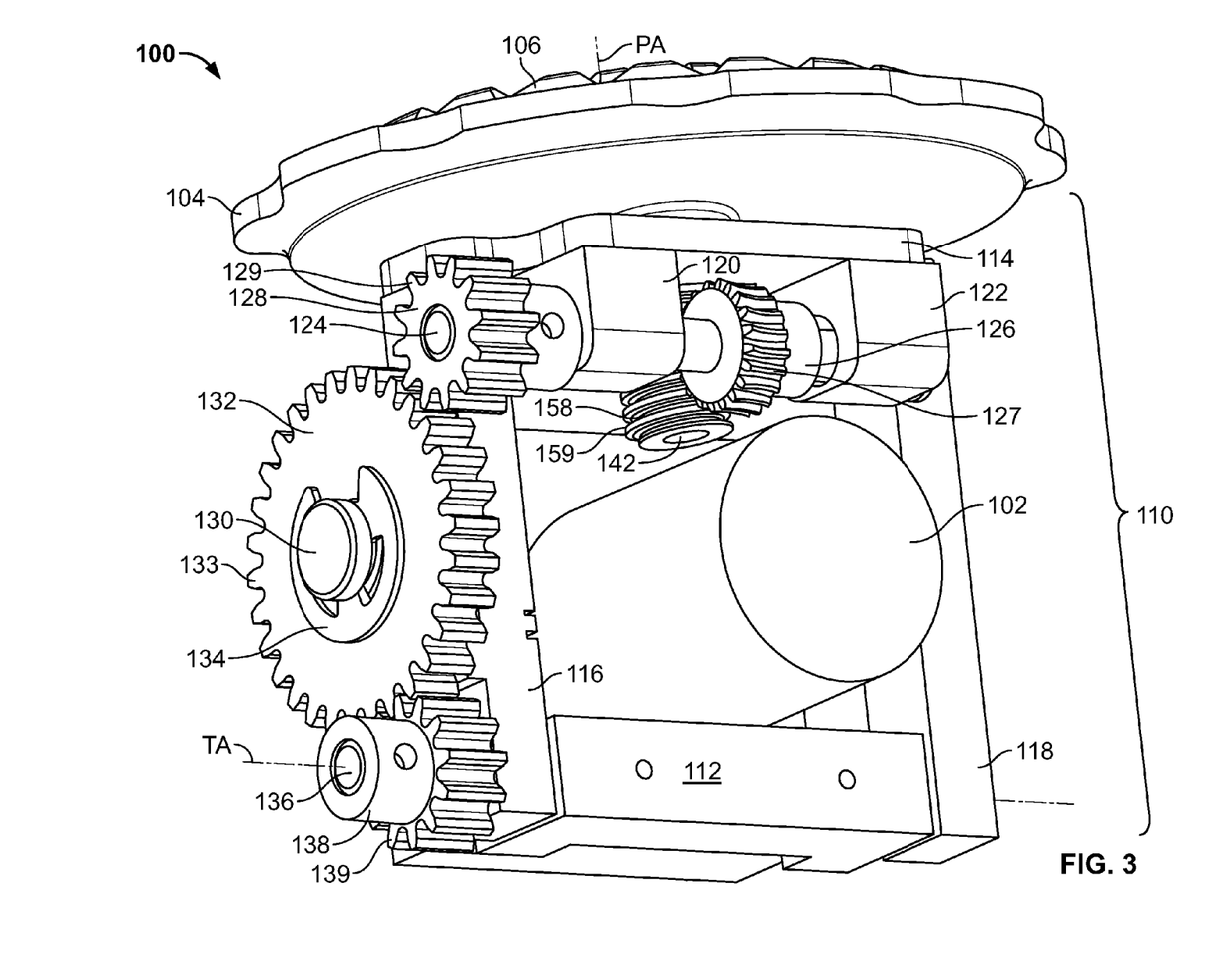
FIG. 3 illustrates a front, bottom perspective view of the apparatus of FIG. 1.

Apparatus 100 may also include a worm 158. Worm 158 is attached to inner shaft 142 using suitable attachment method, for example, welding, adhering, fastening, or press or snap fitting. Worm 158 may include one or more helical threads. As best seen in FIGS. 2-4, worm 158 includes one helical thread 159. Worm 158 is attached to inner shaft 142 at a position within the cavity defined by enclosure 104.

First dial 106, second dial 108, outer shaft 140, inner shaft 142, and worm 158 may be made of any suitable material, for example, metal, plastic, or a composite.

Apparatus 100 further includes a frame assembly 110 that supports sensing device 102 within the cavity defined by enclosure 104. Frame assembly 110 may rotate about first axis PA. Frame assembly 110 may be operatively coupled to first dial 106 such that frame assembly 110, as a whole, rotates about first axis PA as first dial 106 is rotated. Frame assembly 110 may include a base 112 that may rotate about second axis TA. Sensing device 102 is attached to base 112 such that sensing device 102 rotates about second axis TA as base 112 rotates. Frame assembly 110 may also include a pin and gear assembly that operatively couples base 112 to inner shaft 142 and, in turn, second dial 108 such that base 112 and attached sensing device 102 rotate about second axis TA as second dial 108 is rotated.

In some embodiments, frame assembly 110 includes a first plate 114. First plate 114 may be attached to outer shaft 140 such that first plate 114 rotates as outer shaft 140 rotates. First plate 114 may have any suitable shape and may extend generally perpendicular to second axis PA. First plate 114 may be integral with or discrete from (as shown in FIGS. 1-4) outer shaft 140. If discrete, first plate 114 may be attached to outer shaft 140 using suitable attachment method, for example, welding, adhering, fastening, or press or snap fitting. First plate 114 may define an opening 156 through which inner shaft 142 may pass.

Frame assembly 110 may also include first and second spaced apart arms 120 and 122. First and second arms 120 and 122 may extend from first plate 114 in a direction away from first dial 106. First and second arms 120 and 122 may extend generally parallel with first axis PA. First and second arms 120 and 122 may each define a channel (not shown) for rotatably receiving a pin. In some embodiments, first and second arms 120 and 122 can be generally square with rounded distal corners as shown FIGS. 1-4. In some embodiments, first and second arms 120 and 122 may have other suitable shapes.

Frame assembly 110 may further include third and fourth spaced apart arms 116 and 118. Third and fourth arms 116 and 118 may extend from first plate 114 in a direction away from first dial 106. Third and fourth arms 116 and 118 may extend in a direction generally parallel to first axis PA. Third and fourth arms 116 and 118 may each define a channel (not shown) for rotatably receiving a pin. In some embodiments, as shown in FIGS. 1-4, third and fourth arms 116 and 118 may each be substantially rectangular prisms. In some embodiments, third and fourth arms 116 and 118 may have other suitable shapes. In some embodiments, third and fourth arms 116 and 118 extend beyond first and second arms 120 and 122 in a direction generally parallel to the first axis PA.

In some embodiments, the channels (not shown) defined by third and fourth arms 116 and 118 are offset from the channels (not shown) defined by first and second arms 120 and 122 in a direction away from first plate 114. In some embodiments, first and second arms 120 and 122 may be offset from third and fourth arms 116 and 118 in a direction generally in the same plane as second axis TA, but perpendicular to second axis TA. For example, as best seen in FIGS. 1, 3, and 4, first and second arms 120 and 122 may be generally aligned with a front edge of front plate 114, while third and fourth arms 116 and 118 may be generally aligned with a back edge of front plate 114.

In some embodiments, base 112 is rotatably attached to third and fourth arms 116 and 118 as further described below, and base 112 extends between the third and fourth arms 116 and 118. Base 112 may be a generally rectangular prism that extends along a major axis that is generally parallel to the second axis TA. In some embodiments, base 112 may have other suitable shapes for supporting sensing device 102.

Sensing device 102 may be coupled to base 112 using in suitable attachment mechanism 172. For example, as shown in FIGS. 2 and 4, attachment mechanism 172 can be one or more fasteners. In other embodiments, attachment mechanism 172 can be adhesive, snap or press fit coupling elements, or any other suitable attachment mechanisms. As best seen in FIGS. 2 and 4, sensing device 102 is attached directly to a back surface of base 112. In some embodiments though, sensing device 102 may be attached to base 112 at other surfaces.

A pin and gear assembly that operatively couples base 112 to inner shaft 142 and, in turn, second dial 108 may include a plurality of pins and a plurality of gears. One embodiment of a pin and gear assembly is further described below. The pin and gear assembly may include a first generally cylindrical pin 124. First pin 124 extends between first and second arms 120 and 122, and first pin 124 may be rotatably received within the channels defined by first and second arms 120 and 122. An end of first pin 124 may extend beyond first arm 120 in a direction generally perpendicular to first axis PA.

The pin and gear assembly may also include a first gear 126 that is fixedly attached to first pin 124 such that first pin 124 rotates as first gear 126 rotates. First gear 126 has a first plurality of teeth 127. First gear 126 and first pin 124 are arranged and configured such that first plurality of teeth 127 meshes with helical thread 159 of worm 158. Accordingly, as worm 158 rotates about first axis PA, first gear 126 and first pin 124 rotate about an axis generally parallel to second axis TA.

The pin and gear assembly may further include a second gear 128 having a second plurality of teeth 129. Second gear 128 may be fixedly attached to first pin 124 at the end extending beyond first arm 120. Accordingly, second gear 128 rotates as the first pin 124 rotates.

The pin and gear assembly may also include a second generally cylindrical pin 130. Second pin 130 extends from third arm 116 in a direction generally parallel to the second axis TA and away from third arm 116. A third gear 132 having a third plurality of teeth 133 may be rotatably mounted to second pin 130 such that third gear 132 rotates about second pin 130. Second pin 130 and third gear 132 may be configured and arranged such that third plurality of teeth 133 meshes with second plurality of teeth 129 of second gear 128. Accordingly, third gear 132 rotates as second gear 128 rotates. Third gear 132 may be secured to second pin 130 using a retaining washing 134. In some embodiments, as shown in FIGS. 1-4, the gear ratio between third gear 132 and second gear 128 is about 2.5:1. In some embodiments, the gear ratio between third gear 132 and second gear 128 is more than or less than about 2.5:1.

The pin and gear assembly may further include a third generally cylindrical pin 136. Third pin 136 may extend between third and fourth arms 116 and 118, and third pin 136 may be rotatably received within the channels defined by third and fourth arms 116 and 118. An end of third pin 136 may extend beyond third arm 116 in a direction generally perpendicular to the first axis PA. The axis of third pin 136 may be coaxial with the second axis TA.

The pin and gear assembly may further include a fourth gear 138 having a fourth plurality of teeth 139. Fourth gear 138 may be fixedly attached to third pin 136 at the end extending beyond third arm 116. Accordingly, third pin 136 rotates as fourth gear 138 rotates. In some embodiments, as best seen in FIGS. 1, 3, and 4, the gear ratio between fourth gear 138 and third gear 132 is about 0.4:1. In some embodiments, the gear ratio between fourth gear 138 and third gear 132 is more than or less than about 0.4:1.

Base 112 may define a channel for receiving third pin 136, and base 112 may be fixedly attached to third pin 136 such that the base 112 rotates about the second axis TA as the third pin 136 rotates. Base 112 may be integral with or discrete from (as shown in FIGS. 1-4) third pin 136. If discrete, base 112 may be attached to third pin 136 using any suitable attachment method, for example, welding, adhering, fastening, or press or snap fitting.

Frame assembly 110 may be made of any suitable material, for example, metal, plastic, or a composite.

Although frame assembly 110 described above with reference to FIGS. 1-4 includes first plate 114; first, second, third, and fourth arms 120, 122, 116, and 118, and base 112, the frame assembly according to some embodiments may have other suitable support structure configurations. For example, first and third arms 120 and 116 may be an integral piece, and second and fourth arms 122 and 118 may be an integral piece.

In use, a user positions enclosure 104 such that first and second dials 106 and 108 are accessible to the user. In some embodiments, enclosure 104 may be mounted to a wall, ceiling, or any other desired surface. If a user desires to change the field of view of sensing device 102, the user can selectively rotate first dial 106 and/or second dial 108 to change the angular orientation of sensing device 102 about first axis PA and/or about second axis TA, respectively. Particularly, to adjust the angular orientation of sensing device 102 about first axis PA to change the field of view in a direction along first axis PA, the user rotates first dial 106. Rotation of first dial 106 rotates outer shaft 140 which is attached to first dial 106. As outer shaft 140 rotates, the entire frame assembly 110 rotates about first axis PA because outer shaft 140 is attached to first plate 114 of frame assembly 110. Because sensing device 102 is coupled to base 112 of frame assembly 110, the angular orientation of sensing device 102 about the first axis PA is adjusted, changing the field of view of sensing device 102 along the first axis PA. Reversing the rotation of first dial 106 reverses the rotation of frame assembly 110 and sensing device 102 about first axis PA.

To adjust the angular orientation of sensing device 102 about the second axis TA to change the field of view in a direction along second axis TA, the user rotates second dial 108. Rotation of second dial 108 rotates inner shaft 142, which is attached to second dial 108. As inner shaft 142 rotates, worm 158 attached to inner shaft 142 rotates. The interface between helical thread 159 of worm 158 and first plurality of teeth 127 of first gear 126 causes first gear 126 to rotate about the axis defined by first pin 124. Because first gear 126 is fixedly attached to first pin 124, first pin 124 rotates about the axis of first pin 124, which is generally parallel to second axis TA, as first gear 126 rotates. As first pin 124 rotates so too does second gear 128, which is fixedly attached to first pin 124. The interface between second plurality of teeth 129 of second gear 128 and third plurality of teeth 133 of third gear 132 causes third gear 132 to rotate about the axis of second pin 130 in a direction opposite of the rotation of second gear 128. The interface between third plurality of teeth 133 of third gear 132 and fourth plurality of teeth 139 of fourth gear 138 causes fourth gear 138 to rotate about the axis of third pin 136 in a direction opposite of the rotation of third gear 132. Because fourth gear 138 is fixedly attached to third pin 136, rotation of fourth gear 138 causes third pin 136 to rotate. Rotation of third pin 136 causes base 112 to rotate about the second axis TA, which is coaxial with the axis of third pin 136. Because sensing device 102 is coupled to base 112, the angular orientation of sensing device 102 about the second axis TA is adjusted, changing the field of view of sensing device 102 along the second axis TA.

Accordingly, the field of view of sensing device 102 may be adjusted without opening enclosure 104 because first dial 106 and second dial 108 are be positioned external to the cavity defined by enclosure 104.

It is to be appreciated that the Detailed Description section is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An apparatus for rotating a sensing device about a first axis and a second axis relative to a mounting surface, the apparatus comprising:
    a first dial configured to rotate to allow a user to adjust a first axis angular orientation of the sensing device, the first dial being positioned on a first side of the mounting surface;
    a second dial configured to rotate to allow a user to adjust a second axis angular orientation of the sensing device;
    an outer shaft attached to the first dial, the outer shaft defining a first channel, the outer shaft passing through a second channel defined by the mounting surface;
    an inner shaft attached to the second dial, the inner shaft passing through the first channel defined by the outer shaft, the inner shaft being concentric with the outer shaft; and
    a frame assembly attached to the outer shaft, the frame assembly being configured to rotate about the first axis as the first dial is rotated, the frame assembly being positioned on a second side of the mounting surface that is opposite from the first side of the mounting surface, the frame assembly including:
        a base configured to rotate about the second axis, the base being configured to support the sensing device; and
        a pin and gear assembly configured to operatively couple the base to the inner shaft such that rotation of the second dial rotates the base about the second axis;
    wherein: the first dial defines a first recess on a first side of the first dial that is opposite from the mounting surface; and
    the second dial is seated within the first recess.

2. The apparatus of claim 1, wherein the second axis is perpendicular to the first axis.

3. The apparatus of claim 1, wherein the gear and pin assembly comprises a plurality of pins and a plurality of gears.

4. The apparatus of claim 1, wherein the sensing device is a camera that records still or moving images.

5. The apparatus of claim 1, wherein the mounting surface is a surface of an enclosure that houses the sensing device.

6. An apparatus for rotating a sensing device about a pan axis and a tilt axis, the apparatus comprising:
    an enclosure that defines a cavity for housing the sensing device, the enclosure having an exterior surface defining a first channel that extends to the cavity;
    a first dial configured to rotate to allow a user to adjust an angular pan orientation of the sensing device;
    a second dial configured to rotate to allow a user to adjust an angular tilt orientation of the sensing device;
    an outer shaft attached to the first dial, the outer shaft defining a second channel and passing through the first channel defined by the exterior surface of the enclosure; the outer shaft defining an axis that is coaxial with the pan axis;

an inner shaft attached to the second dial, the inner shaft passing through the second channel defined by the outer shaft, the inner shaft being concentric with the outer shaft; and a frame assembly attached to the outer shaft such that the frame assembly rotates about the pan axis as the first dial is rotated, the frame assembly being positioned within the cavity, the frame assembly including:

a base configured to rotate about the tilt axis, the base supporting the sensing device; and a pin and gear assembly operatively coupling the base to the inner shaft such that rotation of the second dial rotates the base about the tilt axis;

wherein: the exterior surface defines a first recess;

the first dial is seated within the first recess;

the first dial defines a second recess on a first side of the first dial that is opposite from the enclosure; and the second dial is seated within the second recess.

7. The apparatus of claim 6, wherein the pan axis is perpendicular to the tilt axis.

8. The apparatus of claim 6, wherein the cavity defined by the enclosure is environmentally sealed.

9. The apparatus of claim 8, wherein:

the first dial defines a first annular notch on a first side of the first dial adjacent the enclosure;

the first dial includes a first gasket securely seated within the first notch, the first gasket contacting the exterior surface of the enclosure to create an environmental seal;

the second dial defines a second annular notch on a first side of the second dial that is adjacent to the first dial; and the second dial includes a second gasket securely seated within the second notch, the second gasket contacting a surface of the first dial to create an environmental seal.

10. The apparatus of claim 9, wherein:

friction between the first gasket and the exterior surface maintains the angular pan orientation of the sensing device; and friction between the second gasket and the surface of the first dial maintains the angular tilt orientation of the sensing device.

11. The apparatus of claim 6, wherein:

the first dial further comprises a first annular portion that includes a first plurality of projections on the first side of the first dial; and the second dial further comprises a second annular portion that includes a second plurality of projections on a first side of the second dial that is opposite from the first dial.

12. The apparatus of claim 6, wherein the gear and pin assembly comprises a plurality of pins and a plurality of gears.

13. The apparatus of claim 12, further comprising a worm attached to the inner shaft; wherein the plurality of gears comprises a first gear that engages the worm.

14. The apparatus of claim 13, wherein:

the plurality of pins comprises:
 a first rotatable pin;
 a fixed second pin; and
 a third rotatable pin that defines the tilt axis;

the plurality of gears further comprises:
 a second gear attached to the first pin such that the second gear rotates as the first pin rotates;
 a third gear rotatably attached to the second pin such that the third gear engages the second gear; and
 a fourth gear attached to the third pin such that the third pin rotates as the fourth gear rotates;

the first gear is attached to the first pin such that the first pin rotates as the first gear rotates; and the base is attached to the third pin such that the base rotates about the tilt axis as the third pin rotates.

15. The apparatus of claim 14, wherein the frame assembly further comprises:

a first plate attached to the outer shaft;

first and second spaced apart arms that extend from the first plate, the first pin being rotatably attached to the first and second arms; and third and fourth spaced apart arms that extend from the first plate, the second pin extending from the third arm; the third pin being rotatably attached to the third and fourth arms.

16. The apparatus of claim 6, wherein the sensing device is a camera that records still or moving images.

17. An apparatus for rotating a camera about a pan axis and a tilt axis, the pan axis being perpendicular to the tilt axis, the apparatus comprising:

an enclosure that defines an environmentally sealed cavity for housing the camera, the enclosure having an exterior surface, the exterior surface defining a first recess, the first recess having a first floor, the first floor of the first recess defining a first channel that extends to the environmentally sealed cavity;

a first dial configured to rotate to allow a user to adjust an angular pan orientation of the camera, the first dial being seated within the first recess and defining a second recess having a second floor on a first side of the first dial, the first dial defining a first annular notch on a second side of the first dial, the second side of the first dial being opposite from the first side of the first dial, the first dial further including a first gasket securely seated within the first notch, the first gasket contacting the first floor of the enclosure to create an environmental seal;

a second dial configured to rotate to allow a user to adjust an angular tilt orientation of the camera and being seated within the second recess, the second dial defining a second annular notch on a side of the second dial that is adjacent to the first dial and further including a second gasket securely seated within the second notch, the second gasket contacting the second floor of the first dial to create an environmental seal;

an outer shaft attached to the first dial, the outer shaft defining a second channel and passing through the first channel defined by the first floor of the enclosure, the outer shaft having an axis that is coaxial with the pan axis;

an inner shaft attached to the second dial and passing through the second channel defined by the outer shaft, the inner shaft being concentric with the outer shaft;

a worm attached to the inner shaft, the worm having a helical thread; and a frame assembly, the frame assembly being configured to rotate about the pan axis as the first dial is rotated, the frame assembly being positioned within the environmentally sealed cavity, the frame assembly including:

a first plate attached to the outer shaft;

first and second spaced apart arms that extend from the first plate in a direction away from the first dial;

a first pin rotatably attached to the first and second arms;

a first gear having a first plurality of teeth and attached to the first pin such that the first pin rotates as the first gear rotates, the first plurality of teeth meshing with the helical thread of the worm;

a second gear having a second plurality of teeth and attached to the first pin such that the second gear rotates as the first pin rotates;

third and fourth spaced apart arms that extend from the first plate in a direction away from the first dial;

a second pin extending from the third arm;

a third gear having a third plurality of teeth and rotatably attached to the second pin, the third plurality of teeth meshing with the second plurality of teeth of the second gear;

a third pin rotatably attached to the third and fourth arms, the third pin having an axis that is coaxial with the tilt axis;

a fourth gear having a fourth plurality of teeth and attached to the third pin such that the third pin rotates as the fourth gear rotates; and a base attached to the third pin such that the base rotates about the tilt axis as the third pin rotates, the base supporting the camera.

\* \* \* \* \*